United States Patent [19]

Kitayama et al.

[11] Patent Number: 4,535,072

[45] Date of Patent: Aug. 13, 1985

[54] ABSORBENT FOR TREATING GASES CONTAINING THE MATERIALS USED FOR SEMICONDUCTOR PRODUCTS AND PROCESS OF TREATING SUCH GASES WITH THE SAME

[75] Inventors: Masayasu Kitayama, Kawasaki; Yoshiaki Sugimori, Tokyo; Schunich Ohta, Fujisawa, all of Japan

[73] Assignee: Nihon Sanso Kabushiki Kaisha, Japan

[21] Appl. No.: 531,345

[22] Filed: Sep. 12, 1983

[30] Foreign Application Priority Data

Sep. 14, 1982 [JP] Japan ................. 57-160396

[51] Int. Cl.$^3$ ..................... B01J 20/04; B01J 20/14; B01J 20/10
[52] U.S. Cl. ..................... 502/411; 502/412
[58] Field of Search .............. 502/411, 412, 84

[56] References Cited

U.S. PATENT DOCUMENTS

| 1,705,482 | 3/1929 | Keyes | 502/411 |
| 1,970,204 | 8/1934 | Stockton | 502/411 |
| 2,423,688 | 7/1947 | Day | 502/412 X |
| 2,693,456 | 11/1954 | Fennell | 502/412 |
| 2,758,096 | 8/1956 | Hill | 502/84 X |

FOREIGN PATENT DOCUMENTS

| 128146 | 7/1983 | Japan | 502/411 |
| 229021 | 2/1925 | United Kingdom | 502/412 |

*Primary Examiner*—Carl F. Dees
*Attorney, Agent, or Firm*—Kane, Dalsimer, Kane, Sullivan and Kurucz

[57] ABSTRACT

An absorbent and process for removing materials for semiconductor products, such as $SiH_4$, $B_2H_6$, $SeH_2$, $AsH_3$, $PH_3$, $GeH_4$, $SiH_2Cl_2$, $SiHCl_3$, $(CH_3)_3Al$, $(CH_3)_3Ga$, etc. from a gas containing above toxic components. The absorbent includes a first and second dry absorbent. The first absorbent induces a solid carrier containing a large proportion of a porous inorganic silicate and impregnated with an aqueous solution of an alkali. The second absorbent has a solid carrier, similar to that in the first absorbent, being impregnated with an aqueous solution of an alkali and an aqueous solution of an oxidizing agent capable of oxidizing german. When used separately, these two absorbents are not capable of treating certain volatile inorganic hydrides or lose their capacity of absorption in a relatively short period for such hydrides. In order to fully treat a gas containing such toxic components, a third absorbent which also includes a porous solid carrier being impregnated with an aqueous solution of an oxidizing agent incapable of oxidizing german may be added the above first and second absorbents. The process includes appropriate combination of all or two of these absorbents performs an excellent treatment of a gas containing any compounds used for manufacturing semiconductors in two or three stages of the treatment.

11 Claims, 2 Drawing Figures

ABSORBENT FOR TREATING GASES CONTAINING THE MATERIALS USED FOR SEMICONDUCTOR PRODUCTS AND PROCESS OF TREATING SUCH GASES WITH THE SAME

BACKGROUND OF THE INVENTION

The present invention relates to an absorbent for treating a gas containing at least one compound of volatile inorganic hydrides, such as silane, diborane, hydrogen selenide, germane, arsine, phosphine, stibine and the like, volatile inorganic halogenides, such as dichlorosilane, trichlorosilane, silicontetrafluoride, borontrichloride, arsenic trichloride and the like, and organometallic compounds, such as trimethylaluminum, trimethylgallium, and the like. The present invention further relates to a process of toxo-cleaning such compounds in gases with the same absorbent.

In the manufacture of integrated circuits, large-scale integrated circuits and the like in the semiconductor industry, volatile inorganic hydrides, volatile inorganic halogenides and organometallic compounds are used in a gaseous or a liquid state for vapour growth deposition, etching, doping and diffusion. Those materials have strong flammability or strong toxicity. For example, silane is of a nature such that even if a trace amount of silane leaks into the air, it burns with a strong reaction with oxygen. It is well known that diborane, hydrogen selenide and germane have strong toxicities. Therefore great caution is necessary to treat it. When waste gases which are exhausted from the above-described semiconductor manufacturing processes contain such toxic components in nitrogen or hydrogen gas as a base gas, safety treatment thereof is required. Heretofore, various processes have been proposed for removing the toxic components. A widely adopted process is wet absorption process, in which a waste gas is brought into countercurrent contact with an aqueous solution of sodium hydroxide, whereby toxic components in the waste gas are absorbed into the sodium hydroxide solution for removal thereof. Although this wet absorption process is advantageous in that waste gases can be processed with relatively cheap sodium hydroxide, it requires a gas treating unit in a relatively large scale or a large amount of sodium hydroxide in order to sufficiently remove certain kinds of toxic gases. Since the waste solution after the absorption of toxic components is an aqueous alkaline solution, wet absorption process has disadvantages in that the handling of the waste solution is inconvenient, in that the disposal thereof is relatively difficult, and in that the cost in transportation of the waste solution for disposal is rather high. The greater the amount of the solution to be disposed increases, the larger such disadvantages become. In another process utilizing the flammability of volatile inorganic hydrides, the toxic materials are removed by bringing them into contact with air for combustion in a combustion chamber having water stored therein. Although such a process may be applied to specific volatile inorganic hydrides such as silane, it can produce an explosion hazard, and further it is not applicable to waste gases containing various kinds of toxic components as exhausted from recent semiconductor manufacturing processes.

SUMMARY OF THE INVENTION

It is therefore an object of the present invention to provide an absorbent which efficiently absorbs, in a less complicated dry absorption process, at least one compound of volatile inorganic hydrides, volatile inorganic halogenides and organometallic compounds.

Another object of the present invention is to provide a dry absorption process in which a gas containing such toxic compounds is treated in a less laborious manner and by means of smaller sized, less complicated and easily handled apparatus than in the prior art processes.

In order to eliminate the above-described drawbacks of the prior art, the inventors studied processes of efficiently removing toxic components in waste gases exhausted from semiconductor manufacturing processes and unexpectedly found that the solid absorbent, in which an aqueous solution of an alkali and/or an aqueous solution of an oxidizing agent is impregnated into a porous solid carrier containing a porous inorganic silicate in a large proportion, absorbs such toxic components more efficiently and economically with higher safety than the prior art processes.

Specifically, according to the present invention there are provided two kinds of absorbents. The first absorbent is produced by impregnating an aqueous solution of an alkali into a porous solid carrier. The second absorbent is produced by impregnating an aqueous solution of an alkali and a first oxidizing agent capable of oxidizing germane such as potassium permanganate into a porous solid carrier. The present invention therefore provides solid absorbents for dry absorption process which treats safely and effectively the waste gases containing at least one compounds of volatile inorganic hydrides, such as silane diborane, hydrogen selenide, germane and the like, and/or volatile inorganic halogenide, such as dichlorosilane, trichlorosilane and the like and/or organometallic compounds such as trimethylaluminum, trimethylgallium and the like.

According to another aspect of the present invention, there is provided a process using the solid absorbents above-described for treating the waste gas exhausted from semiconductor manufacturing processes. The waste gas is passed through a first absorbent in which an aqueous solution of an alkali is impregnated into a porous solid carrier, and through a third absorbent in which an aqueous solution of an oxidizing agent incapable of oxidizing germane is impregnated into a porous solid carrier.

Further, the first and second absorbents may be combined with a third absorbent in which an aqueous solution of a second oxidizing agent incapable of oxidizing germane such a ferric chloride is impregnated into a second solid carrier which may include, for example, a porous inorganic silicate in a large proportion. By appropriate combination of two or all three of these absorbents, many kinds of toxic components contained in waste gases from semiconductor manufacturing processes can almost completely be treated, whereas according to the prior art separate processes must be adopted in treating such toxic components, e.g., arsine and phosphine must be treated by dry absorption, and silane and diborane must be treated by wet absorption. It was noted that this combination of the absorbents exhibited excellent treating capacity for such waste gases and overcame the previously-described disadvantages of the prior art.

DETAILED DESCRIPTION

Figure 1:
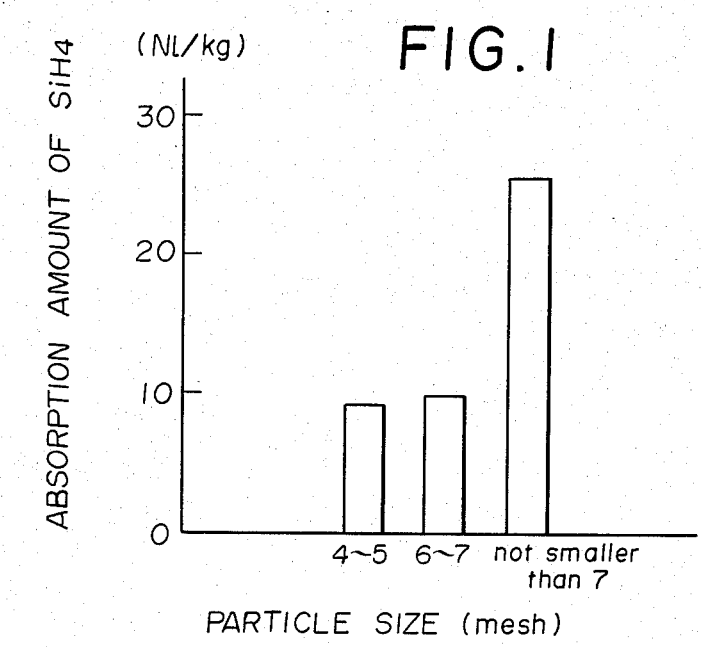
FIG. 1 illustrates an experimental graph showing the relation between the particle size and silane absorption amount of absorbents according to the present invention.
Figure 2:
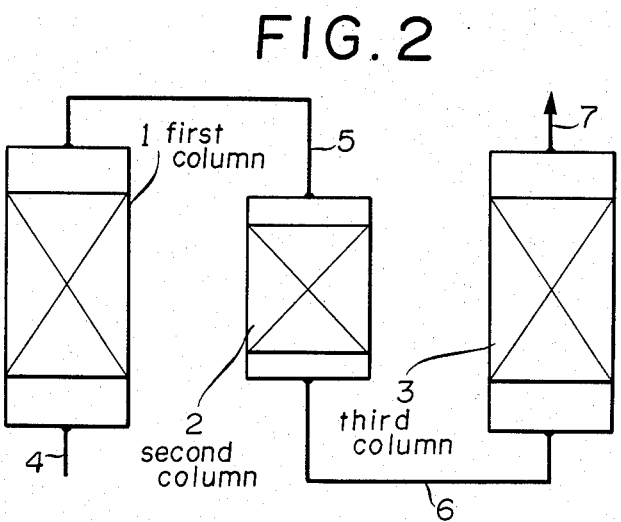
FIG. 2 is a flow sheet illustrating one process according to the present invention.

The first absorbent of the present invention is produced by impregnating an aqueous solution of an alkali into a porous solid carrier.

The solid carrier used in the present invention may be a porous solid carrier containing a larger proportion of an inorganic silicate such as a diatomaceous earth, calcium silicate, bentonite, etc. Our various experiments showed that diatomaceous earths produced the best results.

The aqueous solution of an alkali which is according to the present invention impregnated into a solid carrier may be an aqueous solution of sodium hydroxide, potassium hydroxide, calcium hydroxide or the like. Sodium hydroxide is preferable in cost.

For example, in a case where silane is removed with a diatomaceous earth, as the solid carrier, impregnated with an aqueous solution of sodium hydroxide as the alkali, an excessively low concentration of sodium hydroxide does not react with silane, and an excessively high concentration thereof dissolves the diatomaceous earth, resulting in less convenience in the practical use of the absorbent. Thus, in the present invention an aqueous solution of about 5 to about 30% by weight of sodium hydroxide must be used.

Our experimental results show that the ratio in weight of diatomaceous earth to the aqueous solution of sodium hydroxide is preferably 1:about 0.2 to 1:about 2.

EXAMPLE 1

An absorbent A was prepared by impregnating 100 g of diatomaceous earth with 150 g of an aqueous solution of 10% by weight of sodium hydoxide. The absorbent was filled in an amount of 100 g in a column 2 cm in inner diameter and 50 cm in height. In 30 minutes after a gas mixture containing 10.5% by volume of silane gas (the remainder is nitrogen gas) was allowed to pass through the column at a flow rate of 100 cc/min, the concentration of the silane gas at the outlet of the column was not large than 5 PPM. The absorbent in an amount of 1 kg absorbed about 26 Nl of silane gas when it reached a breakpoint at which the concentration of silane in the gas at the outlet of the column was 500 PPM.

Upon comparison of the above-described example using the absorbent A to the prior art wet absorption process, according to the Example 1 the volume ratio in reaction of silane to sodium hydroxide was 1:1 to 1:1.6 whereas it is well known that in the prior art process that was ordinarily 1:1 to 1:2. Thus, it is clear that the absorbent A according to the first aspect of the present invention is superior in efficiency in the absorption of silane and therefore in saving of sodium hydroxide to wet absorption process. Although also in wet absorption process, the efficient consumption of sodium hydroxide to the same level as the present invention can be achieved under optimum conditions in contact of silane with sodium hydroxide, such optimum conditions require rather complicated and expensive apparatus and laborious maintenance. The absorbent A as the first absorbent achieves highly efficient consumption of sodium hydoxide without requiring any of such conditions.

The inventors carried out further tests, using the absobent A, with respect to many other volatile inorganic hydrides on the same conditions as Example 1, and noted that the absorbent A efficiently absorbed volatile inorganic hydrides such as diborane, hydrogen selenide and the like except arsine, phosphine and germane.

From the well-known fact that volatile inorganic halogenides, such as $SiH_2Cl_2$, $SiHCl_3$, $SiF_4$, $BF_3$, $BCl_3$, $AsCl_3$ and $HCl$, and organometallic compounds, such as $Al(CH_3)_3$, $Al(C_2H_5)_3$, $Ga(CH_3)_3$, $Ga(C_2H_5)_3$, $Zn(CH_3)_2$, $Zn(C_2H_5)_2$, $In(CH_3)_3$ and $In(C_2H_5)_3$, can be hydrolyzed, it would be clear that the absorbent A efficiently treats such compounds.

EXAMPLE 2

The same procedures as in Example 1 were repeated except that a nitrogen gas containing 10.5% by volume of silane and 5% by volume of diborane was allowed to pass through the column. The concentrations of silane and diborane at the outlet of the column after 30 min. from the start of supply of the sample gas was shown in TABLE 1.

EXAMPLE 3

The same procedures as in Example 1 were repeated except that nitrogen gas containing 5% by volume of germane was allowed to pass through the column. The results are shown in Table 1.

The first absorbent according to the present invention may be further impregnated with a first oxidizing agent capable of oxidizing germane to form a second absorbent. This second absorbent is produced by impregnating a porous solid carrier with an aqueous solution of an alkali and of an oxidizing agent. The second absorbent has a notable effect in removing above-mentioned toxic components. The oxidizing agent may be any appropriate one such as potassium bromate, hydrogen peroxide, sodium hypochlorite, and conveniently potassium permanganate, which changes its color when any reaction occurs. Potassium permanganate changes its color from purple through brown to white according to decrease in its power of oxidization and hence the breakthrough thereof is clearly noted. Furthermore, potassium permanganate is advantageous in that it increases its power of oxidization in the presence of an alkali such as sodium hydroxide. In order to obtain the second absorbent, the first absorbent which has a porous solid carrier impregnated with an aqueous solution of an alkali may be further impregnated with an aqueous solution of the above-described oxidizing agent. Alternatively, a porous solid carrier may be impregnated with an aqueous solution having both such an alkali and an oxidizing agent. The inventors noted by experiments that the aqueous solution preferably contained about 2 to about 5% by weight of the first oxidizing agent.

EXAMPLE 4

An absorbent B was prepared by impregnating 100 g of diatomaceous earth with 150 g of an aqueous solution of 10% by weight of sodium hydroxide in which solution 5 g of potassium permanganate had been dissolved. The same procedures as in Example 1 were repeated except that the absorbent B was used instead of the absorbent A. The experimental results are shown in TABLE 1.

EXAMPLE 5

The same procedures as in Example 2 were repeated except that the absorbent B was used instead of the absorbent A. The results are shown in TABLE 1.

EXAMPLE 6

The same procedures as in Example 3 were repeated except that the absorbent B was used in place of the absorbent A. The results are shown in TABLE 1.

It is clear from TABLE 1 that the absorbent B produced excellent results particularly in removing diborane and germane.

TABLE 1

| | Concentration at column outlet after 30 min from start of gas supply | | |
|---|---|---|---|
| | Silane | Diborane | Germane |
| Example 1 | not larger than 5 PPM | — | — |
| Example 2 | not larger than 5 PPM | larger than 0.1 PPM | — |
| Example 3 | — | — | 5% |
| Example 4 | not larger than 5 PPM | — | — |
| Example 5 | not larger than 5 PPM | not larger than 0.1 PPM | — |
| Example 6 | — | — | 100 PPM |

EXAMPLES 7-11

With respect to arsine, phosphine and hydrogen selenide, further experimental tests were made in a manner similar to Examples 4 to 6. The experimental results, which are shown in TABLE 2, showed that the absorbent B sufficiently absorbed germane arsine and phosphine, and achieved an excellent results in removing silane, diborane and hydrogen selenide.

EXAMPLES 12-19

With respect to volatile inorganic halogenides and organometallic compounds, many tests were carried out in the same manner as in Example 1 except that the absorbent B was used in place of the absorbent A. The results are shown in TABLES 3 and 4, from which it is apparent that the absorbent B exhibited excellent absorbency with respect to volatile inorganic halogenides and organometallic compounds named in TABLES 3 and 4. Furthermore, the excellent absorbency of the second absorbent with respect to $(C_2H_5)_3Al$, $(CH_3)_3Ga$, $(C_2H_5)_3Ga$, $(CH_3)_3In$, $(CH_3)_5In$, $(CH_3)_2Zn$ and $(C_2H_5)_2Zn$ and the like was noted from other data.

TABLE 2

| Example No. | 4 | 7 | 8 | 6 | 9 | 10 | 11 |
|---|---|---|---|---|---|---|---|
| Gas used | $SiH_4$ | $B_2H_6$ | $SeH_2$ | $GeH_4$ | $PH_3$ | $AsH_3$ | $H_2S$ |
| Absorption amount (Nl/kg) | 50 | 10 | 54 | 1.5 | 0.8 | 1.6 | 36 |

TABLE 3

| Example No. | 12 | 13 | 14 | 15 | 16 | 17 |
|---|---|---|---|---|---|---|
| Gas used | $SiH_2Cl_2$ | $SiF_4$ | $BF_3$ | $BCl_3$ | HCl | $AsCl_3$ |
| Absorption amount (Nl/kg) | 68 | 95 | 190 | 34 | 160 | 75 |

TABLE 4

| Example No. | 18 | 19 |
|---|---|---|
| Gas used | $Al(CH_3)_3$ | $Ga(CH_3)_3$ |
| Absorption amount (Nl/kg) | 80 | 80 |

The first and second absorbents produce relatively large pressure loss in the absorption unit in which those absorbents are filled. Granulation of those absorbents reduces such pressure loss. For this granulation, an appropriate amount of bentonite may be added to the first and second absorbents, for example, 40 g of bentonite may be added to 1 kg of each absorbent, and then the granulation may be made by means of Henschel type granulator.

EXAMPLES 20-22

A bentonite was added in an amount of 40 g to 1 kg of absorbent A prepared as in Example 1, and then granulation was made by means of a Henschel type granulator. In this manner three absorbents of 4 to 5 meshes, 6 to 7 meshes and not smaller than 7 meshes were prepared. With respect to each of the absorbents a test was carried out in the same manner as in Example 1 in order to determine the absorption amount thereof for silane. The results are plotted in FIG. 1, from which it is noted that the smaller the particle size of the absorbent grows, the larger the amount of absorption thereof becomes, and that a critical value was obtained when the particle size thereof is not smaller than 7 meshes. This is because the contact area of the absorbent with the gas increases in reverse proportion with the particle size thereof. For the practical use, the appropriate particle size is not smaller than 6 meshes in view of pressure loss.

Now, the process, according to the present invention, of treating a gas containing many kinds of the above-described toxic componds will be described.

These processes are performed with a combination of treating steps of two or three of the first and second absorbents and a third absorbent in which a porous solid carrier is impregnated with an aqueous solution of oxidizing agent such as ferric chloride. The waste gas contained plural kinds of toxic components from semiconductor manufacturing processes can be treated by two or three steps in which the appropriate combination of these three kind of absorbents is used.

Specifically, the inventors noted by experiments that these processes had excellent capacity of treating the waste gas which even contains several kinds of volatile inorganic hydrides, and that they overcame the disadvantages of the first and second absorbents of being incapable of absorbing certain kinds of inorganic hydrides or losing the treating capacity in a short period of time.

In the third absorbent, the solid carrier may be a solid carrier containing a larger proportion of a porous inorganic silicate such as diatomaceous earth, calcium silicate, bentonite, etc. The solid carrier for the third absorbent is impregnated with an aqueous solution of an oxidizing agent, of which the impregnation rate to the solid carrier is preferably high. Further, this oxidizing agent is not required to have a capacity of oxidization to such a degree that germane is oxidized, and hence may include, for example, ferric chloride, sulfurous acid, cupric chloride and mercuric chloride.

It was noted that the third absorbent sufficiently removed volatile inorganic hydrides except silane and germane, and absorbed particularly diborane, arsine and phosphine with excellent results. Further, the third absorbent excellently removed certain kinds of volatile inorganic halogenides such as dichlorosilane.

Processes according to the present invention which excellently treat the gas containing plural toxic components by making the best use of features of each absorbents will be describe hereinafter, (1) A treating process with the first and the third absorbent When a waste gas to be treated contains only hydrogen selenide, it is treated with the first absorbent to thereby absorb a larger proportion of hydrogen selenide, and then the remainder is treated with the third absorbent, in which stage a small amount of hydrogen selenide is absorbed to below a threshold limit value. With such procedures the third absorbent is efficiently used.

When a waste gas to be treated contains two or more compounds of volatile inorganic hydrides except germane, the third absorbent compensates for the incapability of the first absorbent in absorption of phosphine and arsine, and on the other hand the first absorbent compensates for the incapability of the third absorbent in absorption of silane. Thus the combination of the first and the third absorbents achieves an excellent treatment of such gases. When this waste gas to be treated contains two or more compounds including hydrogen selenide of volatile inorganic hydrides except germane, first of all a larger proportion of hydrogen selenide is absorbed in the first absorbent, and then the remainder is removed by the third absorbent.

EXAMPLE 23

Absorbent A was prepared in the same manner as in Example 1. An absorbent C was prepared by impregnating 100 g of a diatomatious earth with 100 g of an aqueous solution of 45% by weight of ferric chloride. A gas mixture consisting of the components descibed in TABLE 5 was allowed to pass through a first column of the same size as in Example 1 having the absorbent A filled in an amount of 100 g in it and then pass through a second column of the same size having the absorbent C filled in an amount of 80 g in it. The results are shown in TABLE 5.

EXAMPLE 24

The same procedures as in Example 23 were repeated except that firstly the gas was allowed to pass through the second column and then pass through the first column. The results are also shown in TABLE 5.

TABLE 5

| | Ex. 23 | Ex. 24 | Ex. 25 | Ex. 26 | Ex. 27 |
|---|---|---|---|---|---|
| Gas components (vol. %) | | | | | |
| $SeH_2$ | 15.1 | 15.1 | — | — | 11.1 |
| $PH_3$ | 5.0 | 5.0 | 5.0 | 5.0 | — |
| $AsH_3$ | 4.9 | 4.9 | — | — | 5.3 |
| $GeH_4$ | — | — | 5.3 | 5.3 | 4.9 |
| $N_2$ | 75.0 | 75.0 | — | — | — |
| $H_2$ | — | — | 89.7 | 89.7 | — |
| Ar | — | — | — | — | 78.7 |
| Linear gas velocity in column (cm/sec) | 0.53 | 0.53 | 0.51 | 0.51 | 0.49 |
| Absorbent amount needed for treating 1 $Nm^3$ of gas supplied (kg) | | | | | |
| Absorbent A | 2.8 | 0 | — | — | 1.0 |
| Absorbent B | — | — | 35.4 | 97.9 | 32.7 |
| Absorbent C | 19.8 | 170.8 | 10.1 | 0 | 10.6 |
| Concentration at column outlet before breakthrough (PPM) | | | | | |
| $SeH_2$ | 0.05 or less | 0.05 or less | — | — | 0.05 or less |
| $PH_3$ | 0.1 or less | 0.1 or less | 0.1 or less | 0.1 or less | — |
| $AsH_3$ | 0.05 or less | 0.05 or less | — | — | 0.05 or less |
| $GeH_4$ | — | — | 101 | 108 | 105 |

(2) A treating process with the second and the third absorbents

This combination of the second and the third absorbents can sufficiently treat all the volatile inorganic hydrides which the combination of the first and the third absorbent absorbs, and can further treat germane gas. When a waste gas to be treated contains arsine and/or phosphine, and further any of volatile inorganic hydrides except hydrogen selenide, it is treated by the third absorbent for largely removing phosphine and arsine, and then treated by the second absorbent. With this process the consumption of the oxidizing agent of the second absorbent is reduced since the third absorbent treats a larger amount of arsine and phosphine.

EXAMPLE 25

Absorbents B and C were prepared in the same manner as in Examples 4 and 23 respectively. A gas mixture consisting of the components described in TABLE 5 was allowed to pass through the second column used in Example 23 having the absorbent C filled in the same amount, and then pass through a third column of the same size as in Example 1 having the absorbent B filled in an amount of 100 g in it. The results are shown in TABLE 5.

EXAMPLE 26

The same procedures as in Example 25 were repeated except that the gas was allowed to pass through the third column and then pass through the second column. The results are also shown in TABLE 5.

(3) A treating process with a combination of the first to the third absorbents

This combination can treat all the volatile inorganic hydrides the second and the third absorbents absorb. When a gas to be treated contains arsine, phosphine, germane and/or hydrogen selenide, the gas is firstly treated with the first absorbent for removing a large proportion of hydrogen selenide, is secondly treated with the third absorbent for removing arsine and phosphine, and is lastly treated with the second absorbent. With such procedures the degradation of the third absorbent by hydrogen selenide is largely prevented by the first absorbent, and the degradation of the second absorbent is prevented by the third absorbent, whereby excellent treatment of the gas is performed. Even if the above-described gas contains volatile inorganic halogenides and/or organometallic compounds, the above-described process can be applied to it since each of the first and the second absorbents can independently treat such compounds.

EXAMPLE 27

Absorbents A, B and C were prepared in the same manner as in Example 1, 4 and 23 respectively. A gas consisting of the components described in TABLE 5 was allowed to pass through the first, second and third columns, containing the absorbents A, C and B in the same amount as in Examples 1, 23 and 4 respectively, in the described order. The results are shown in TABLE 5.

In performing all the processes above described, the absorbents should be kept wet by appropriately humidifying the gas since all the treating processes described above are based on hydrolysis reaction, hydration and dissolution to water.

Referring to the drawing there is illustrated a typical apparatus which is used to apply the present invention, the apparatus being to treat more than one volatile inorganic hydride which may contain arsine and/or phosphine and except hydrogen selenide. The treating apparatus includes a first column 1 filled with a third absorbent having a diatomaceous earth impregnated with an aqueous solution of ferric chloride, a second column 2 connected to first column 1 through a line 5 and filled with a diatomaceous earth which is impregnated with water or an aqueous solution of sodium hydroxide, and a third column 3 connected to the second column 2 through a line 6 and filled with the second absorbent having a diatomaceous earth impregnated with an aqueous solution of sodium hydroxide and an aqueous solution of potassium permanganate.

With such construction, for example, a nitrogen gas containing arsine, phosphine, silane, diborane, germane and dichlorosilane is introduced through a line 4 into the first column 1 where arsine, phosphine, diborane and dichlorosilane are removed by the third absorbent, and then the nitrogen gas containing remaining silane and germane issues from column 1 into the line 5 and is introduced through the column 2 into the column 3 where silane and germane are removed by the second absorbent, so that a gas containing almost only nitrogen gas flows through a line 7. The column 2 serves to treat a vapor of hydrogen chloride which is produced in the column 1 during the treatment of the gas. If this column 2 was not provided, the hydrogen chloride vapor would be entrained by the gas passing through the column 1 and introduced into the column 3 where it deteriorates sodium hydroxide contained in the second absorbent. The provision of the column 2 is therefore necessary, for example, when ferric chloride is used as an oxidizing agent in the third absorbent of column 1, and also when the flow rate in the column 1 is raised according to the increase in the amount of a gas to be treated, so that the amount of a hydrochloride vapor produced in the column 1 is also increased.

While the invention has been disclosed in specific detail for purposes of clarity and complete disclosure, the appended claims are intended to include within their meaning all modifications and changes that come within the true scope of the invention. For example, the order in the use of the first to third absorbents in the above-described processes (1), (2) and (3) is not limited to the order specified therein.

What is claimed is:

1. An absorbent for treating a gas containing at least one compound of volatile inorganic hydrides, volatile inorganic halogenides and organometallic compounds, comprising an aqueous solution of an alkali impregnated into a porous carrier, said alkali being at least one selected from a group consisting of sodium hydroxide, potassium hydroxide and calcium hydroxide.

2. An absorbent for treating a gas containing at least one compound of volatile inorganic hydrides, volatile inorganic halogenides and organometallic compounds, comprising an aqueous solution of alkali and an oxidizing agent capable of oxidizing germane, the aqueous solution being impregnated into a porous solid carrier, the alkali being at least one selected from the group consisting of sodium hydroxide, potassium hydroxide and calcium hydroxide.

3. An absorbent as recited in claim 1 or 2 wherein the porous solid carrier includes a large proportion of an inorganic silicate.

4. An absorbent as recited in claim 3, wherein the inorganic silicate is at least one selected from a group consisting of a diatomaceous earth, a calcium silicate and a bentonite.

5. An absorbent as recited in claim 2, wherein the oxidizing agent is potassium permanganate, potassium bromate, hydrogen peroxide or sodium hypochlorite.

6. An absorbent as recited in claim 2, wherein the aqueous solution of the oxidizing agent contains about 2% to about 5% by weight of potassium permanganate.

7. An absorbent as recited in claim 5, wherein the aqueous solution of the alkali contains about 5% to about 30% by weight of sodium hydroxide.

8. An absorbent as recited in claim 7 or 2, wherein the weight ratio of the porous solid carrier to the aqueous solution of sodium hydroxide is 1:about 0.2 to 1:about 2.

9. An absorbent as recited in claim 4, wherein the inorganic silicate includes a granulated diatomacous earth containing a bentonite as a binder.

10. An absorbent as recited in claim 9, wherein the granulated diatomaceous earth is of a particle size not smaller than 6 meshes.

11. An absorbent as recited in claim 1, wherein the aqueous solution of alkali contains about 5% to about 30% by weight of sodium hydroxide.

* * * * *